UNITED STATES PATENT OFFICE 2,420,564

PROCESS OF PRODUCING FERROSILICON

Percy H. Royster, Montclair, N. J.

No Drawing. Application April 27, 1942,
Serial No. 440,703

7 Claims. (Cl. 75—133.5)

This invention relates to the production of iron-silicon alloys, of silicon content higher than 20% by weight, in a fuel-fired shaft furnace, e. g., a blast furnace. It relates to the production of standard ferro-silicon of 50% and 70% grades (silicon content) and also to the production of substantially pure silicon (termed herein "ferrosilicon of 100% grade").

Iron-silicon alloys containing less than 5% to 7% silicon are generally classed as "pig iron." Alloys containing from 7% to 16% and 18% silicon are variously termed "silvery iron," "Bessemer ferrosilicon," "Duriron," etc. In the following description, the term ferrosilicon unless otherwise defined, will refer to metal containing not less than 20% silicon, with relatively low content of alloying elements (Mn, Cr, P, S, etc.) other than iron.

"Silvery iron" containing from about 14% to about 17% of silicon has been produced for many years in blast furnaces, and it is not improbable that at infrequent intervals of operation silvery iron of 18% to 19% silicon has been so produced. So far as I have been able to ascertain, metal containing as much as 20% silicon has not been made in the blast furnace blown with atmospheric air, and most metallurgists had considered 20% to be an upper limit for blast furnace silicon content: higher silicon alloys heretofore were considered to fall within the exclusive domain of the electric furnace.

Iron-silicide has the composition $Fe_3Si$ and contains 14.32% by weight of silicon and 85.68% of iron. When the silicon content of an iron-silicon alloy is carried above 14.32% the molecular composition of the metal consists of silicon dissolved in iron-silicide. For example, a 20% silicon metal, which is taken herein as a dividing line between "silvery iron" and "ferrosilicon," has the molecular composition 33.2 molar percent silicon and 66.8 molar percent iron-silicide. This accepted upper limit of blast furnace silicon corresponds to one-third silicon dissolved in two-thirds $Fe_3Si$. It may be thought to correspond to a hypothetical silicide $Fe_2Si$ (20.1% silicon by weight) although experimental evidence of the existence of such a compound is not conclusive.

Silicon is produced in any furnace (electric or blast) by the carbon reduction of silica. In the electric furnace process, silica, iron as metallic scrap, and carbon as coke, are charged, without flux, and the reduction of $SiO_2$ is effected by carbon to produce metal with concurrent production of very little slag. In my present process silica is fluxed with slag-forming constituents and the reduction reaction takes place according to the following equation:

$$SiO_2(\text{solution}) + 2C(\text{solid}) \rightleftarrows Si(\text{solution}) + 2CO(\text{gas}) \quad (1)$$

At 25° C. the standard entropy change $\Delta S°$ of this reaction is 86.32 E. U. (entropy units, cal/mol° C.), and the endothermic heat of reaction $\Delta H°$ (entropy change) is 148,550 cal/mol (9540 B. t. u. per pound of silicon). When the reaction is carried out at 1557° C. (2834° F.), $\Delta H°$ is increased several per cent to 155,900 cal/mol (10,000 B. t. u. per pound of silicon) in the circumstance that the reaction takes place between C and $SiO_2$ in undiluted liquid state, the silicon produced is in undiluted liquid state and the CO produced is at the pressure of one atmosphere. In these circumstances, the entropy change for Reaction 1 is decreased slightly to 85.30 E. U. (instead of 86.32 E. U. at 25° C.).

In the operation of my invention, the reactants and products are usually diluted and the CO is at other than atmospheric pressure. When dilution and pressure changes occur, the following three symbols in parenthesis, viz., (Si), ($SiO_2$) and (CO), are used to represent the molar concentration of silicon in the alloy, the molar concentration of the silica in the slag, and the pressure of the furnace hearth (in atmospheres absolute), respectively. The equilibrium constant of Equation 1 is given by the expression:

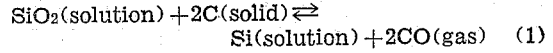

$$k = \frac{(Si)}{(SiO_2)}(CO)^2 \quad (2)$$

when $k$ is a function of the reduction temperature $T_c$, determined by the free energy equation $$-RT_c \log_e k = \Delta H° - T_c \Delta S° \quad (3)$$

Changing $\log_e$ to $\log_{10}$, introducing the values 155,000, 85.30 and 1.989 for $\Delta H°$, $\Delta S°$ and R, respectively, Equation 3 becomes:

$$T_c = \frac{34,100}{18.70 - \log_{10} k} \quad (4)$$

Equations 2 and 4 are sufficient to describe the conduct of the reduction reaction under any conditions in which the reaction may take place in the blast furnace.

Ferrosilicon of high analysis, e. g., 50% ferrosilicon, requires a higher reduction temperature than silvery iron. Fifty per cent ferrosilicon consists of 84.25 molar per cent silicon, and 16.74 molar per cent $Fe_3Si$. The value of (Si) in Equation 2 for 50% ferrosilicon is 0.842 instead of 0.332 for 20% "silvery iron." By Equation 4, $T_c$ is increased 40° F. in raising the alloy grade from 20% to 50%. While significant, this increase in $T_c$ is less than had generally been supposed.

A much greater increase in $T_c$ is caused by increase in hearth pressure. At the point in the furnace where silicon reduction takes place, i. e., where liquid $SiO_2$ contacts coke-carbon, CO is produced at the carbon-liquid interface, and this CO is undiluted and at hearth pressure. The term (CO) appearing in Equation 2 refers, therefore, to hearth pressure (measured in atmospheres). The equilibrium constant $k$ varies as the square of the hearth pressure, and any increase in hearth pressure greatly raises the temperature of reduction, $T_c$.

When a modern American blast furnace is operating with regular stock descent, without "hanging" and "slipping," the pressure of the blast measured in the hot blast main averages 13 to 16 lbs./sq. in. gauge (i. e., above barometric). The drop in pressure from hot blast main to the furnace interior averages about 2 lbs./sq. in., so that the hydrostatic pressure inside the furnace hearth ranges from 11 to 14 lbs./sq. in. gauge (i. e., 25.7 to 28.7 lbs./sq. in. absolute). At 12.5 lbs./sq. in. gauge (1.85 atmos.) the value of $(CO)^2$ is 3.43 atmos.[2]. By suitable alteration of furnace design and of blowing procedure, the hearth pressure may be reduced to 2 lbs./sq. in. gauge; the value of $(CO)^2$ then is decreased from 3.43 to 1.29 atmos.[5], $(SiO_2)$ and $T_c$ will remain constant, and (Si) will vary inversely as $(CO)^2$. A blast furnace making 20% silvery iron with a hearth pressure of 12.5 lbs./sq. in. gauge will "equally well" make 41% ferrosilicon at 2 lbs./sq. in. gauge hearth pressure. The phrase "equally well" here means at the same temperature of reduction $T_c$, with the same thermal efficiency and with the same coke consumption (in pounds of coke per ton of silicon produced).

A further decrease in hearth pressure to 1 lb./sq. in. gauge (1.068 atmos. abs.) will raise the "grade" of the alloy from 41 to 56% without increasing the temperature of reduction $T_c$. By the installation of an "induced draft" blower in the exhaust-gas main of the blast furnace (in the "down comer" or "gas main"), it is possible to lower the pressures of the hearth under that of the surrounding atmosphere, i. e., in the "vacuum" range. Wherever the term "minimum hearth pressure" is used herein, it is not to be supposed that barometric pressure (i. e., zero lbs./sq. in. gauge) is meant to be the "minimum"; operation of a furnace with hearth pressure below the barometric is specifically contemplated in many applications of my present invention.

An alternate method of raising the silicon content of ferrosilicon without increasing $T_c$, which does not involve decreasing hearth pressure, consists in increasing $(SiO_2)$, the molar concentration of silica in the slag. It is important here to define exactly this term "$(SiO_2)$." Slags are classified and controlled, by all blast furnace operators of my acquaintance, by reference to their "acid" contents, by which the operators invariably mean the "arithmetic sum of the weight per cent of $Al_2O_3$ and $SiO_2$ in the slag." The term "acid slag" as used by such operators means "$Al_2O_3$ plus $SiO_2$ greater than 50%." This method of thinking is obviously founded on the assumption that bases and acids combine in such a fashion that one pound of either $SiO_2$ or $Al_2O_3$ joins with one pound of CaO or MgO. A slag containing 25% each of CaO, MgO, $Al_2O_3$ and $SiO_2$ in blast furnace parlance is termed "neutral"; it is thought of as being neutral.

The blast furnace is operated as if the slag actually were "neutral." The molar percentages of the constituents, considered as a mutual solution of the four uncombined oxides, of course is 23.94% $SiO_2$, 14.35% $Al_2O_3$, 25.82% CaO and 35.90% MgO and the molar percentage of acids is only 38.29%, not 50%. It has been shown, however (Feild and Royster U. S. Bureau of Mines Tech. paper, 1919, pages 187 and 189), that in a molten slag the component oxides are not "free" but are combined into silicates, aluminates and alumino-silicates. The molecular composition of this so-called "neutral" slag therefore is:

|  | Molar per cent |
|---|---|
| Forsterite ($Mg_2SiO_4$) | 58 |
| Gehlenite ($Ca_2Al_2SiO_7$) | 23 |
| Spinel ($MgAl_2O_4$) | 5.5 |
| Calcium aluminate ($CaAl_2O_4$) | 6.8 |
| 5.3 calcium aluminate ($Ca_5Al_6O_{14}$) | 6.7 |

The slag is, in fact, strongly basic, being 81 molar per cent orthosilicate of magnesium plus the basic alumino-silicate of lime, and gehlenite which functionally is an orthosilicate.

Silicon can be reduced from such a slag as that just referred to, but such a reduction does not proceed according to Equation 1. The reduction of silicon from gehlenite takes place in two successive steps. First the reaction $$Ca_2Al_2SiO_7 \rightleftharpoons CaAl_2O_4 + CaSiO_3 \qquad (5)$$

occurs, i. e., gehlenite dissociates into the aluminate and metasilicate of lime. This dissociation involves changes in entropy $\Delta H°$ and entropy $\Delta S°$ which are small compared with the values 155,000 cal/mol and 85.3 E. U., respectively, Equation 1, and can be ignored without serious error.

The reduction of silicon from calcium metasilicate follows the reaction $$CaSiO_3 + 2C \rightleftharpoons CaO + Si + 2CO \qquad (6)$$

exhibiting an entropy change $\Delta H°$ of 192,000 cal/mol (approximately 24% higher than $\Delta H°$ in Equation 1).

For the reduction of silicon from calcium metasilicate (wollastonite), $T_c$ is given by the free energy relation:

$$T_c = \frac{42,100}{18.70 - \log_{10} k} \qquad (7)$$

$T_c$ from Equation 7 is 700° F. higher than $T_c$ from Equation 4, i. e., for the reduction of silica when in excess of that combined to form metasilicates (including anorthite, which functionally is a metasilicate).

It seems necessary to emphasize that the expression "$(SiO_2)$" signifies the "molar concentration of uncombined $SiO_2$ in the slag," and is not related to the total silica content of the slag whether the total $(SiO_2)$ is expressed in percentage by weight or in molar percentage. Otherwise, the present invention is difficult to explain to the furnace operator who seemingly cannot divorce his notions of slag control from his arithmetically simple assumption that one pound of any kind of base "neutralizes" one pound of any kind of acid, from his theorem that "acid" slags promote silicon reduction, and from his further hypothesis that a slag is "acid" when its weight percentage of $Al_2O_3$ plus $SiO_2$ is greater than one-half the total.

In order to distinguish clearly between the present invention which teaches that (Si) is linearly proportional to $(SiO_2)$ when $T_c$ and (CO)

are constant, from presently accepted theories, the following examples are given:

|  | Slag A | Slag B | Slag C |
|---|---|---|---|
| Per cent by Weight of— |  |  |  |
| CaO | 29.80 | 33.25 | 35.85 |
| MgO | 8.40 | 4.20 | 1.20 |
| Al₂O₃ | 11.50 | 6.50 | 2.50 |
| SiO₂ | 49.85 | 54.85 | 58.85 |
| S | 0.90 | 2.40 | 3.20 |
|  | 100.45 | 101.20 | 101.60 |
| Less oxygen equivalent of sulphur | −0.45 | −1.20 | −1.60 |
|  | 100.00 | 100.00 | 100.00 |

Each of these three slags shows 61.35% "acids" ($SiO_2+Al_2O_3$), but the values of "($SiO_2$)" in the meaning of Equation 2 for A, B and C are quite different. This may be seen immediately from the molecular composition of these slags:

|  | Slag A | Slag B | Slag C |
|---|---|---|---|
| Molar Per cent of— |  |  |  |
| Wollastonite ($CaSiO_3$) | 52.92 | 48.95 | 48.56 |
| Enstatite ($MgSiO_3$) | 28.06 | 11.26 | 2.81 |
| Anorthite ($CaAl_2Si_2O_8$) | 15.23 | 6.89 | 2.36 |
| Calcium sulphide (CaS) | 3.79 | 8.13 | 9.52 |
| Silica ($SiO_2$) | 0.00 | 24.78 | 36.76 |

Slag A contains no uncombined silica, ($SiO_2$)=0, its composition consisting solely of calcium and magnesium metasilicates, anorthite, and calcium sulphide. Slag B has a molar concentration ($SiO_2$)=0.2478 (one-fourth "free" silica), and slag C has a molar concentration ($SiO_2$)=0.3676 (one-third "free" silica). These three slags which react so differently with respect to silicon reduction would, by the conventionally accepted definition of "acidity," be considered equally "acid."

The above two methods of producing ferrosilicon by the present invention are, in actual fact, identical because both operate to increase (Si) at constant $T_c$. For example, at constant reduction temperature, the molar concentration of silicon (Si) is given (by rewriting Equation 2) as:

$$(Si) = k\frac{(SiO_2)}{(CO)^2} \quad (8)$$

(Si) is increased by decreasing $(CO)^2$ (since it appears in the denominator) or by increasing ($SiO_2$) (since it appears in the numerator). Each is properly described as a method of "increasing the ratio of ($SiO_2$)-to-$(CO)^2$." In carrying out my present invention, I generally prefer to utilize both of these expedients, i. e., to increase ($SiO_2$) and to decrease $(CO)^2$ as far as the limits of practical operation permit.

I am seldom content, however, to confine the reduction of silicon solely to the improvement which results from increasing the ratio of ($SiO_2$)-to-$(CO)^2$. Greater intensity of silicon reduction may be realized with economic success by increasing $T_c$, i. e., by operating the furnace at higher hearth temperatures. It is probably true that ferrosilicon could be made in a blast furnace with such blast temperatures as are now employed in modern practice, but since such alloy production would necessitate the consumption of uneconomically large amounts of coke, no practical importance will attach to this fact. When attempting the production of ferrosilicon in a fuel-fired furnace in competition with alloy made in an electric furnace with low cost power, e. g., 25 to 35 mils/k. w. h., it is necessary to attain an approach to fuel economy. This can be realized only by the use of higher blast temperatures than are at present employed, and higher indeed than operators generally have believed could successfully be employed.

Before the development of the "pebble" type stove in 1933, known blast heating devices were incapable of heating the blast to temperatures higher than 1500 to 1600° F. Many operators in fact were reluctant to push stove heats above 1450° F. blast temperature, because of the probable danger of damaging the brick work in the stoves. By the use of pebble stoves of the type described in my U. S. Reissue Patent No. 19,757, little difficulty is encountered in raising blast temperatures to 2600 and 2800° F., when the stove is built with ordinary grade fire brick; by constructing the pebble stoves with the (somewhat expensive) high-duty refractories now available in the market and composed variously of MgO, $Cr_2O_3$, $Al_2O_3$, $ZrO_2$, $ZrSiO_4$, etc., blast temperatures as high as 3600 and 3800° F. are readily realized. Blast furnace operation in the "high" hot-blast range, e. g., from 1600 to 3600° F. is not a problem only of producing those blast temperatures. Difficulties arise which threaten the continuation of the entire furnace operation whenever blast temperatures are carried above an upper limit which will vary somewhat with the individual furnace and with the particular smelting operation undertaken.

At high blast temperature, every blast furnace with which I am familiar will "hang," i. e., the uniform descent of the charge column in the shaft becomes impaired, and frequently is completely halted. This phenomenon is familiar to all operators. Its cause is readily understood, and it is an essential feature of all blast furnace operations whenever metallurgical coke is employed as fuel. At 1000 to 1200° F. blast temperatures, the lumps of coke lying in the neighborhood of the blast entrance, i. e., in the combustion zone, have been found to exhibit an average temperature of 3050° F. to 3100° F. as measured with an optical pyrometer (cf. Royster and Joseph, Trans. Am. Inst. Min. Eng., volume "Pyrometry" (1920), page 554), when the mean "hearth temperature" (viz., average of the mean slag and mean metal temperatures) was 2750° F. In such operations as were examined by Royster and Joseph, "hanging," although not completely absent, was not serious. It is obvious from reference to Equations 1, 2 and 4, supra, that silica in the coke ash, being intimately dispersed throughout the coke lump and in reactive contact with coke carbon, is reduced to metallic silicon at temperatures far below the 3050° F. and 3100° F. obtaining at the nose of the tuyères. The metallic silicon thus produced is above the melting point of silicon (2600° F.) but below its boiling point (4148° F.). The liquid silicon produced (alloyed with Fe also in the coke ash) remains harmlessly inside the coke lump. When "high" blast temperatures are employed, the temperature of the coke lumps is raised. The vapor pressure of silicon increases as its boiling point is approached. With the blast temperature at 1600° F. to 1800° F., the temperature of the coke lumps in the combustion zone reaches the boiling point of silicon. The silicon distills from the interior of the coke lumps, commingles with the gas stream, is swept up the furnace shaft with the gas, is cooled during ascent, its temperature falls below the temperature of silicon reduction, and the reverse of Equation 1 takes place, viz.:

$$Si(vapor) + 2CO(gas) \rightarrow SiO_2(fume) + 2C(soot) \quad (9)$$

that is to say, silicon vapor is reoxidized by CO, forming finely divided silica fume and carbon soot. A fraction of this finely divided suspended matter becomes lodged on the materials, coke, stone, etc., descending the shaft, building up accretions on the surfaces of the charge particles, obstructing the interstitial channels between the solids through which the furnace gases must flow, and creating a "tight" charge column, requiring increased pressure to force the gases through the latter. This clogging of the channels in the charge raises the hearth pressure progressively. Ultimately the force of the gas stream acting upwardly on the charge column exceeds the force of gravity acting downwardly on it, and descent of the charge is halted. When the charge column is "held up from below" by the blast pressure the "furnace" is said to "hang." It is necessary then momentarily to interrupt the flow of blast into the furnace, thereby removing the upward force of the gas stream and permitting the charge column to descend freely under gravity. In the operator's parlance, this interruption of the flow of air into the furnace is called a "pull" or a "check," i. e., the operator "checks the blast" or "pulls the furnace." When the charge column descends under gravity, the "furnace" is said to "slip."

In the practice of my invention it is desirable to abandon the age-old blast furnace procedure of permitting pressure to build up until the furnace "hangs" before checking the blast to cause a slip. As the hearth pressure rises due to building up of fume in the gas channels, $(CO)^2$ in Equation 2 increases, raising $T_c$ to a value higher than the temperature of the reduction zone. The reduction of silicon is impaired, the grade of metal falls, and the production of ferrosilicon of desired grade ceases. Consequently, as soon as hearth pressure begins to rise above normal, I find it desirable to "check" the blast and thereby to dislodge the fume and reduce the back pressure from the charge column. This novel procedure requires more frequent "checks," and in the operator's present opinion accentuates the irregularity of stock movement. Operators have observed that with a "hanging" furnace, when frequent checking of the blast is necessary, the quality of the metal is impaired. Unfortunately, operators have ignored the thermodynamic significance of the rise in hearth pressure (which is not now recognized as a harmful factor in all blast furnace operation) and have attributed the poor results observed under hanging-checking-slipping conditions to the "irregularity" of the stock descent. The "smooth working" of a furnace is usually judged by the frequent slips; good practice calls for maintaining full blast until after the hearth pressure has built up to the point where the stock descent is completely halted before interrupting the flow of blast into the furnace. In usual practice when a furnace "hangs" a period of waiting (frequently twenty minutes) is permitted, during which period the operator hopes the furnace will "slip itself," i. e., that the charge column will slide down the furnace shaft without blast interruption, a phenomenon which may, or may not, take place. While checking is postponed, high hearth pressures prevail, and silicon reduction is diminished if not halted. A typical modern blast furnace which would exhibit a "normal" hearth pressure of 12 lbs./sq. in. gauge, when not hanging will build up to 24 lbs./sq. in. gauge when hanging. If the furnace is "pulled" at the instant the hang occurs, the time-average hearth pressure is ½ (12+24) or 18 lbs./sq. in. gauge, with an average value of $(CO)^2$ of 4.92 atmos.² If the pressure build-up takes 20 minutes, and if the operator following standard practice waits 20 minutes before checking the blast, the time-average pressure will be ½ (18+24) or 21 lbs./sq. in. corresponding to an average value of $(CO)^2$ of 5.88 atmos.² If the operator follows the teachings of the present invention and checks the blast 10 minutes after the pressure build-up starts, i. e., when it has attained a pressure increase of only one-half of its rise from 12 lbs./sq. in. (normal) to 24 lbs./sq. in. ("hanging"), the pressure will have attained a maximum of only 18 lbs./sq. in. when the blast is checked and "normal" pressure restored. By following this procedure the time-average hearth pressure is ½ (12+18) or 15 lbs./sq. in. and the average value of $(CO)^2$ will be 4.07 atmos.² It is seen that there is a difference of 48% (5.88 as against 4.07) in the value of $(CO)^2$ in Equation 2, caused by the difference between the two methods of controlling the blast.

It is emphasized that the present process premises the operation of a blast furnace with a continuously rising hearth pressure, and my invention specifically includes the device of dislodging the accumulating fume in the charge column by intentionally enhanced irregularity in blowing rate, with the requirement of interrupting blast flow as frequently as necessary and desirable to maintain hearth pressure at a minimum. In particular, I recommend checking the blast before the hearth pressure reaches the point where the furnace hangs.

The loss of grade of the alloy produced thus by the failure of the operator to comply with the principle of the present invention which teaches him to adopt a blowing routine to maintain hearth pressure at a minimum time-average, is not the most serious operating difficulty encountered. If the operator has followed the present instructions, he will be operating with a siliceous slag, the term "siliceous" being defined herein to refer to a slag containing a relatively high molar concentration of "free" silica (i. e., uncombined with CaO, MgO, $Al_2O_3$, $F_2O_3$, MnO, etc.). When normal silicon reduction is suppressed as the hearth pressure is permitted to rise, the $SiO_2$ in the charge, which is not reduced, remains in the slag, increasing the slag volume and also increasing the silica content of the slag. The resultant increase in $(SiO_2)$, although favorable to silicon reduction, renders the slag so highly viscous that its free-running character is impaired, and the loss of slag fluidity may (and frequently does) cause a choking of the smelting zone, combustion zone and hearth with a mass of sluggish, viscous slag, and causes a further increase in hearth pressure.

The heretofore-accepted furnace practice in such circumstance requires the lowering of the blast temperature several hundred degrees, to remedy the hanging of the furnace. The present invention requires an increase in blast temperature, to increase the available hearth heat, restore silicon reduction, diminish the quantity of slag, lower its $SiO_2$ content, eliminate its high viscosity, and bring the grade of alloy back to standard. In this respect, again, the process of the present invention is diametrically opposed to heretofore-accepted blast furnace procedure.

In producing ferrosilicon according to my invention, it is an essential feature that the highest practical blast temperature be employed, in order to maintain the coke consumption at a satisfactory minimum. In almost every actual case, the necessary blast temperature will produce a combustion zone temperature high enough to cause reduction of $SiO_2$ in the coke ash, and contaminate the furnace gases with silicon vapor and reoxidized fume. In many cases, I contemplate operating with blast temperatures as high as 2000° to 2400° F. in which circumstances the combustion zone temperature is high enough to cause reduction of the $Al_2O_3$ in the coke ash. When I heat the blast to between 2500° and 2800° F., not only is reduction of $Al_2O_3$ in the coke ash complete but also the temperature is above the boiling point of aluminum (3723° F.) although below the boiling point of $Al_2O_3$ (5390° F.). At blast temperatures from 3000° F. to 3300° F., the coke ash is completely reduced by coke-carbon, including the $SiO_2$, $Al_2O_3$, $CaO$ and $MgO$. Although the iron in the coke ash is reduced at the lowest temperature, it remains undistilled in the coke lump longest, the boiling point of iron (4955° F.) being higher than the other reduced metals Si, Al, Ca and Mg. At the highest blast temperature here contemplated, the coke ash is completely reduced and distilled.

In operating a given furnace to produce ferrosilicon, it is desirable not only that the time-average of the hearth pressure be maintained at a minimum value, i. e., prevent a pressure rise above normal, but also that this "normal" hearth pressure be itself made a minimum. The most effective method of attaining low hearth pressure is to decrease the ratio of the furnace height to its average cross-sectional area. If "$h$" indicates the height of the furnace shaft from the blast entrance (center line of the tuyères) to the average stock-line (in feet), and if "$V$" represents the volume of the charge column (in cubic feet), then the average area "$A$" (in square feet) is given by $V/h$. The ratio of furnace height to average area $A$, hereinafter called its "caliber," is defined, therefore, as $h$ divided by $V/h$ or $h^2/V$ (in $feet^{-1}$). For example, for the furnace in which pressures were measured by Kinney (U. S. Bureau of Mines T. P. No. 442. "The Blast Furnace Stock Column," S. P. Kinney (1928), page 10, Figure 2), the furnace volume $V$ (between tuyère plane and mean stock line) is 22,680 cu. ft., the height $h$ is 69 feet, the mean area $A$ is 326 sq. ft. ($V/h$), and the "caliber" is 0.218 $feet^{-1}$. The hearth pressure was measured as 14.75 lbs./sq. in. gauge (Figure 48, page 124). The back pressure at the stock line was 1.96 lbs./sq. in. gauge, the pressure drop through the furnace being 12.79 lbs./sq. in. (14.75 minus 1.96). The pressure gradient per foot of furnace height was 0.185 lb./sq. in./foot (12.79÷69 feet $h$). If the height of this furnace be reduced to two-thirds its actual value, e. g., to 46 feet (from stock line to tuyère), the pressure gradient would remain unchanged (with the same blowing rate) and the pressure drop through the furnace would be only 0.185×46 or 8.5 lbs./sq. in. With the same top pressure of 1.96 lbs./sq. in., the hearth pressure would be 10.46 lbs./sq. in. The reduction of furnace height $h$ to two-thirds value (caliber reduced from 0.216 to 0.144) decreases the value of $(CO)^2$ in Equation 2 from 4.02 $atmos.^2$ to 2.94 $atmos.^2$. A 30% increase in average cross-sectional area $A$ (from 326 sq. ft. to 422 sq. ft. by increasing all diameters 14%) would decrease the pressure gradient from 0.185 lb./sq. in./ft. to 0.1092 lb./sq. in./ft., due to the fact that the pressure gradient will vary as the square of the gas velocities. With a 46 foot height and a 30% increase in average area, the pressure drop through the furnace would be only 5.02 lbs./sq. in., corresponding to a hearth pressure of 6.98 lbs./sq. in. (5.02 plus back pressure at furnace top of 1.96 lbs./sq. in.). The value of $(CO)^2$ is decreased to 2.17 with the 30% increase in A, the caliber of the furnace is reduced to 0.111 $foot^{-1}$.

In designing a blast furnace for carrying out the process of the present invention, I prefer to decrease its active height at least to one-half (34'6") if not to one-third (22'0"), if its mean section area is to be left unaltered (at 326 sq. ft.), that is, I design the furnace with the unusually small "calibers" of 0.108 and 0.072 respectively; I also enlarge the dimensions of the gas main, dust catchers, gas scrubbers, stove and boiler burners, in order to decrease the back pressure at the furnace top to 6–8 inches of water pressure (0.22 to 0.29 lb./sq. in.), thereby decreasing the hearth pressure to 6.57 lbs./sq. in. (for the half height) and to 4.32 lbs./sq. in. (for one-third height), corresponding to values of $(CO)^2$ as low as 2.09 $atmos.^2$ and 1.67 $atmos.^2$, respectively. While the present invention is not limited in any respect to the details of furnace design and construction as such, it is true the geometric shape of the furnace and the relation of its height to its cross-section are factors in my present process to the extent that these dimensions and ratios control and affect the hearth pressure. Since hearth pressure is a very significant factor in the control of the temperature of silicon reduction $T_c$, the design of the furnace, in an indirect way at least, has an important influence on the process of producing ferrosilicon.

The term "critical temperature" as applied to the blast furnace hearth was introduced into the discussion of the fuel economy of the blast furnace by the late J. E. Johnson, Jr. (cf. "Principles, Operation and Products of the Blast Furnace"), and the general principles of his "available" hearth heat theory were explained by him in considerable detail. The exact definition of the "critical temperature", as Johnson used it, was not very precise; he appears to have identified it with the "free flowing temperature" of the slag without defining that term. On the production of ferrosilicon in the blast furnace, I have found that the temperature of silicon reduction $T_c$ (defined in Equation 3) is identical with Johnson's "critical temperature." I have found further that his method of computing the "heat available above the critical temperature" by means of a hearth heat balance is substantially correct as Johnson described it. In discussing the production of phosphorus in the blast furnace, Royster and Turrentine (Industrial and Engineering Chemistry, vol. 24, page 223, Feb. 1932), illustrate the method of applying Johnson's available hearth heat principle to the reduction of phosphorus. In attempting to carry out the presently invented process, the blast furnace operator will have little chance of technical success unless he is prepared to calculate the available hearth heat for each furnace operation he undertakes.

In order to indicate the proper method of determining available heat the following illustration of the production of ferrosilicon in the blast furnace is given:

ILLUSTRATION 1

In producing 50% ferrosilicon by my invention I charge into a blast furnace, in the course of a 24-hour day, the following materials:

|  | Pounds |
|---|---|
| Coke | 629,000 |
| Ore | 144,700 |
| Sandstone | 394,000 |
| Limestone | 128,600 |
| Cast iron scrap | 20,600 |
| Steel scrap | 29,400 |

The furnace produces:

|  | Gross tons (2,240 lbs.) per day |
|---|---|
| Ferrosilicon | 100 |
| Slag | 130 |
| Dust | 2.13 |
| Fume | 14.35 |

The materials charged have the following analysis:

|  | Ore | Sandstone | Limestone |
|---|---|---|---|
|  | Per cent | Per cent | Per cent |
| $SiO_2$ | 36.61 | 94.72 | 1.18 |
| $Al_2O_3$ | 3.56 | 0.87 | 0.35 |
| CaO | 0.36 | 0.22 | 50.40 |
| MgO | 0.08 | 0.14 | 3.30 |
| $Fe_2O_3$ | 53.75 | 1.97 | 0.54 |
| $MnO_2$ | 0.21 | 0.08 | 0.04 |
| $P_2O_5$ | 0.15 | 0.05 | 0.03 |
| $SO_3$ | 0.02 | 0.01 | 0.25 |
| $CO_2$ | 0.19 | 0.32 | 42.72 |
| $Na_2O$ | 0.05 | 0.17 | 0.06 |
| $K_2O$ | 0.02 | 0.11 | 0.04 |
| $H_2O$ (<105° C.) | 2.35 | 1.13 | 1.07 |
| $H_2O$ (>105° C.) | 2.08 | 0.21 | 0.02 |
|  | 100.00 | 100.00 | 100.00 |

|  | Cast Iron Scrap | Steel Scrap |
|---|---|---|
| Fe | 94.48 | 98.95 |
| Mn | 0.25 | 0.46 |
| Si | 1.32 | 0.12 |
| P | 0.45 | 0.06 |
| S | 0.22 | 0.07 |
| C | 3.28 | 0.34 |
|  | 100.00 | 100.00 |

Coke

| Proximate Analysis | | Ultimate Analysis | | | |
|---|---|---|---|---|---|
|  |  |  | Per cent |  | Per cent |
| Moisture | 1.75 | $H_2O$ | 1.75 | $SiO_2$ | 5.34 |
| Volatile | 1.15 | Volatile | 1.15 | $Al_2O_3$ | 2.47 |
| Fixed Carbon | 87.29 | Fixed Carbon | 86.22 | CaO | 0.68 |
| Ash | 9.81 | Fixed Hydrogen | 0.23 | MgO | 0.23 |
|  | 100.00 | Nitrogen | 0.18 | $P_2O_5$ | 0.04 |
| Sulphur | 0.87 | Sulphur | 0.87 | $Na_2O$ | 0.13 |
|  |  | Iron | 0.62 | $K_2O$ | 0.09 |

The ferrosilicon and slag produced have the following analysis as reported in weight percentage and as converted into molar percentage:

Ferrosilicon

| By Weight | | Molecular Composition | |
|---|---|---|---|
|  | Per cent |  | Per cent |
| Si | 50.37 | Silicon (Si) | 82.62 |
| Mn | 0.25 | Iron Silicide ($Fe_3Si$) | 15.76 |
| P | 0.21 | Iron Phosphide ($Fe_3P$) | 0.378 |
| S | 0.013 | Iron Sulphide (FeS) | 0.23 |
| C | 0.003 | Manganese Carbide ($Mn_3C$) | 0.014 |
| Fe | 49.15 | Manganese (Mn) | 0.21 |
|  | 100.00 |  | 100.00 |

Slag

| By Weight | | Molecular Composition | |
|---|---|---|---|
|  | Per cent |  | Per cent |
| $SiO_2$ | 65.63 | Silica ($SiO_2$) | 56.31 |
| $Al_2O_3$ | 7.86 | Wollastonite ($CaSiO_3$) | 26.25 |
| CaO | 23.29 | Enstatite ($MgSiO_3$) | 4.75 |
| MgO | 2.04 | Anorthite ($CaAl_2Si_2O_8$) | 7.20 |
| S | 1.79 | Calcium Sulphide (CaS) | 5.13 |
| FeO | 0.07 | Grünerite ($FeSiO_3$) | 0.09 |
| $M_2O$ | 0.03 | Rhodonite ($MnSiO_3$) | 0.05 |
| $Na_2O$ | 0.11 | Sodium Silicate ($Na_2SiO_3$) | 0.17 |
| $K_2O$ | 0.08 | Potassium Silicate ($K_2SiO_3$) | 0.08 |
| $P_2O_5$ | 0.004 |  |  |
|  | 100.90 |  | 100.00 |
| Less oxygen equivalent of sulphur | −0.90 |  |  |
|  | 100.00 |  |  |

The furnace used has the total height from stock line to tuyères of 19 feet, its interior diameters being 12 feet at the stock line, 18 feet 6 inches at the bosh, and 14 feet at the hearth. The bosh height is 6 feet 6 inches, the bosh angle 71 degrees. The in-wall batter in the mantle is 3.3 inches per foot of height. The "active" volume of the furnace (between blast entrance and stock line) is 3770 cu. ft. (V), its average cross-sectional area A is 198 sq. ft. (V/$h$), and its caliber ($h$/A) is .096 feet$^{-1}$.

The furnace is blown with a normal blast flow of 23,700 cu. ft./min. of atmospheric air measured at 60° F. and 14.7 lbs./sq. in. pressure, at an average blast-main pressure of 2.5 lbs./sq. in. gauge, at the blast temperature of 2750° F. The blast enters the furnace through six water-cooled tuyères, 12 inches in diameter. The blast pressure drops 0.63 lb./sq. in. in going from the blast main to the interior of the hearth, the pressure inside the hearth being 1.87 lbs./sq. in. gauge (16.57 lbs./sq. in absolute, 1.127 atmospheres). Because of the frequent interruptions of the blast due to "checking," there is a loss of 125 minutes per day in blowing time, the average flow of blast being only 21,600 cu. ft./min. (at 60° F. and 14.7 lbs./sq. in.).

The temperature of the slag as it emerges from the hearth averages 2950° F., and the metal 2840° F. to 2875° F., when the optical pyrometer readings are corrected for emissivity. Due to flame, smoke, fume, and rapid sculling on the surface of the metal and slag streams, these temperatures are difficult to determine accurately.

The furnace (under normal wind) produces 32,220 cu. ft. per min. of top gas (measured at 60° F.) which averages 29,720 cu. ft./min. when allowance is made for loss of blowing time due to checks. This gas is extremely "dirty" in the sense that it carries a large volume of extremely fine silica fume. Although the weight of fume is not great (4.8 grains/cu. ft.) it is difficult to remove the fume from the gas because of its fineness. The loading of ordinary blast furnace "flue dust," caught in the dust catcher and primary scrubber, is small (0.72 grain/cu. ft.).

The analyses of the gas, dust and fume are as follows:

| Dry Top Gas (by volume) | | Dust (by weight) | | Fume (by weight) | |
|---|---|---|---|---|---|
|  | Per cent |  |  |  |  |
| $CO_2$ | 2.18 | $SiO_2$ | 59.50 | $SiO_2$ | 66.50 |
| CO | 37.83 | $Al_2O_3$ | 5.15 | $Al_2O_3$ | 4.68 |
| $H_2$ | 1.96 | CaO | 7.90 | Carbon | 20.16 |
| $N_2$ | 58.03 | MgO | 0.75 | $Na_2CO_3$ | 5.57 |
|  |  | FeO | 16.50 | $K_2CO_3$ | 3.14 |
|  |  | Carbon | 10.20 |  |  |

The gas discharges from the furnace top at a very high temperature, averaging 1675° F., making it necessary to water cool the top of the furnace where exposed to this hot gas, including the big bell and hopper. The stock line becomes white hot before each charge is dumped off the big bell. A very hot, dirty top-gas is an essential feature of the present process of producing ferrosilicon. It requires some care but no great ingenuity to design the gas main and gas cleaning system for this service. An electrostatic precipitator is recommended for the final clean-up of gas heavily laden with silica fume.

The very high top temperature of the furnace is due to the large amount of heat generated in the furnace in excess of the total thermal requirements of the process. This excess of thermal input over thermal requirements is due to the small fraction of the total heat which is "available" above the "critical temperature" (Johnson), meaning the temperature of silicon reduction ($T_c$ of Equation 2).

The value of $T_c$ here is seen to be: hearth pressure, 1.87 lbs./sq. in. gauge $$(CO) = 1.27 \ (CO)^2 = 1.27 (atmos.^2)$$

Metal analysis—molar concentration of silicon (Si) =0.8362
Slag analysis—molar concentration of silica ($SiO_2$) =0.5631

By Equation 2, $k=1.88$, $\log_{10}k=0.274$, and by Equation 4, $T_c=1843°$ F. (1570° C., or 2858° F.).

By reference to the carbon charged, the wind blown, and the top gas analysis, it is seen that 288 lbs. of coke-carbon per minute, or 4124 lbs. carbon per ton of alloy, is oxidized by the $O_2$ of the blast. The total thermal input into the reduction zone or smelting zone of the furnace is the sum of (a) the heat of the blast entering at blast temperature (2750° F.), (b) the heat of the carbon entering the smelting zone, at $T_c$ (2858° F.), and (c) the heat generated by the reaction between coke-carbon and blast oxygen to form CO (3960 B. t. u./lb. carbon). The total heat generated in the smelting zone per lb. of carbon burned by $O_2$ in the blast is

*Table 1.—Hearth heat balance, A: Thermal input B. t. u. per lb. carbon burned by the blast $O_2$ at the tuyères, measured above 60° F. base line*

|  | B. t. u. |
|---|---|
| Item 1, combustion of 1 lb. C | 3960 |
| Item 2, heat of 75.67 cu. ft. of air (3.5 grams per cu. ft. moisture) | 4240 |
| Item 3, heat of 1.275 lbs. C entering at $T_c$ | 1572 |
| Item 4, total thermal input | 9772 |

The thermal input to the smelting zone can be compared with the thermal requirements of this zone, which latter include the endothermic chemical reactions taking place therein, the heat lost through the brick walls and to the water cooling devices (tuyères, etc.) and (as the largest item of all) the sensible heat of the gases leaving the smelting zone at $T_c$. The slag and metal are free flowing at 2670° F. (controlled by the slag viscosity) and pick up a small amount of heat in passing through the smelting zone (items 9 and 10, Table 2). The greater part of the heat in the hot metal and slag (including heat of fusion) was absorbed in the furnace shaft before the slag and metal entered the smelting zone. Table 2 following gives the thermal requirements of the smelting zone:

*Table 2.—Hearth heat balance, B: B. t. u./lb. of carbon required to maintain hearth equilibrium at $T_c=2858°$ F.*

|  | B. t. u. |
|---|---|
| Item 1, reduction of 0.269 lb. silicon | 2690 |
| Item 2, reduction of 0.014 lb. iron | 79 |
| Item 3, reduction of 0.0085 lb. phosphorus | 84 |
| Item 4, reduction of 0.002 lb. manganese | 19 |
| Item 5, reaction of 0.8 cu. ft. blast moisture with carbon | 121 |
| Item 6, preheating 0.542 lb. metal in transit through zone | 56 |
| Item 7, preheating 0.730 lb. slag in transit through zone | 64 |
| Item 8, heat loss through walls and coolers | 494 |
| Item 9, reduction of 0.025 Si from coke ash | 260 |
| Item 10, heat (unavailable) of gases leaving zone at $T_c$ | 5905 |
| Item 11, total thermal requirements | 9772 |

Item 10 shows that 60% of the total thermal input into the smelting zone must be lost to that zone. Comparison of items 1 and 10 of Table 2 shows that for every B. t. u. used in silicon reduction more than two B. t. u.'s are "unavailable." The total heat of reduction for the alloy (sum of items 1 to 4) is only 2872 B. t. u. and is less than 30% of the total thermal input to the hearth. Even this low "thermal efficiency" is attained only with the very high hot blast used. Referring to Table 1, item 2, it is seen that the hot blast brings into the furnace 7% more heat than is generated by the combustion of carbon. At lower blast temperatures the fraction of the total heat available for silicon reduction decreases rapidly, which explains the rapid increase in coke consumption observed when operating at low blast temperatures. It also explains why all previous attempts to produce silicon alloys of silicon content higher than 20% in the blast furnace have failed.

My present invention consists, in its simplest terms, in providing to the smelting zone a thermal input with an available fraction adequate to meet the thermal requirements of the smelting reactions. The failure of previous attempts to produce high-analysis ferrosilicon in the blast furnace has been caused by a failure to meet this thermodynamic requirement. Operators have attempted to produce ferrosilicon in the blast furnace, and with excessive use of coke have introduced more than enough total heat to carry out the hearth reactions many times over; however, because of their failure to recognize the magnitude of the unavailable fraction of total heat (item 10, Table 2) their efforts failed, and most operators have become convinced that the blast furnace cannot produce ferrosilicon carrying more than 20% silicon.

In applying the present invention to furnace operations other than that described in the above example (Illustration 1) it becomes necessary to repeat the calculations for the changed conditions. For example, the coke consumption for 50% ferrosilicon with a blast temperature of 2750° F. is 6290 lbs. coke per gross ton of ferrosilicon as given above. If the blast temperature is altered, it is necessary to change the amount of coke in each charge to provide "available" heat in the smelting zone in an amount which is adequate to meet the thermal requirements of the hearth reactions with the altered blast temperature. For each different hot blast temperature it is necessary, of course, to recompute the hearth heat requirements. To indicate the nature of the results when this has been done, the following table is given:

Table 3.—*Coke combustion, and daily tonnage of 50% ferrosilicon in Illustration 1 for varying hot blast temperatures*

| Blast Temperature, °F. | Coke Consumption, lbs./gross ton alloy | Tonnage, tons alloy/day |
| --- | --- | --- |
| 920 | Infinite | none |
| 1,000 | 68,000 | 9 |
| 1,100 | 33,000 | 18 |
| 1,200 | 25,000 | 24 |
| 1,500 | 14,300 | 43 |
| 2,000 | 8,850 | 71 |
| 2,500 | 6,750 | 93 |
| 3,000 | 5,500 | 111 |
| 3,500 | 4,730 | 128 |
| 4,000 | 4,150 | 147 |

For a hearth pressure of 1.87 lbs./sq. in. gauge, and for slag of the composition given in Illustration 1, Table 3, of course, is a complete, sufficient description of my present invention, so far merely as the production of ferrosilicon is concerned. For the process to be useful, in the sense that it is economically practical, it is necessary to set an upper limit on the coke consumption. The present invention purports to be an improvement in the method of producing ferrosilicon. But a process is only an improvement when the value of the product made exceeds the cost of the materials used in its production. It is a fact, of some academic interest perhaps, that 50% ferrosilicon can be made with low hearth pressure and with a high "free" silica in the slag with any blast temperature above 920° F. At 1000° F. the production of the alloy (9 tons per day) with a coke consumption of 68,000 lbs. is not a "process" in the sense intended in this description: at $4.50 per ton of coke, the cost of the coke alone is more than $150 per ton of alloy produced. Since the ferrosilicon produced is worth less than $75, such an operation is not a "process" in any practical sense. In the appended claims where the phrase used is the "process of economically producing ferrosilicon," the term "economically" is herein defined as a specific disclaimer which is intended to confine the scope of the present invention to those furnace operations only in which the coke consumption is sufficiently low so that the cost of the raw materials used, plus the cost of the furnace operation, does not exceed the commercial value of the alloy produced. In the above table, for example, it is possible to state that, at present prevailing prices, both of the materials charged and of alloy produced, a coke consumption somewhat below 12,000 lbs./ton of alloy is necessary to permit the operation properly to be defined as the "economical" production of ferrosilicon. A coke consumption of 12,000 lbs. or less corresponds to a blast temperature of 1640° F. or higher. Since the cost of the materials and the value of the product may change in a manner impossible to anticipate, it is not feasible to set a precise and fixed limit either to the maximum coke consumption or the minimum blast temperature.

It should be recalled that the relationship between coke consumption and blast temperature, as shown in Table 3, is applicable only to the hearth pressure of 1.87 lbs. gauge. Without great difficulty, it is possible to repeat the calculations for a hearth blast balance (as in Tables 1 and 2) for several hearth pressures. For example:

Table 4.—*Coke consumption as controlled by varying hearth pressure and blast temperature in Illustration 1*

| Blast temperature, °F. | Hearth Pressure, lbs./sq. in. (above and below) | | | | | | |
| --- | --- | --- | --- | --- | --- | --- | --- |
| | −5 | −2 | +0 | +2 | +5 | +8 | +10 |
| 1,000 | 33,000 | 42,700 | 47,000 | 75,000 | | | |
| 1,100 | 24,400 | 26,000 | 29,800 | 36,200 | 22,000 | | |
| 1,200 | 18,700 | 20,300 | 22,000 | 26,000 | 55,000 | 128,000 | |
| 1,300 | 15,700 | 17,300 | 17,900 | 19,800 | 32,000 | 47,200 | 75,000 |
| 1,400 | 13,400 | 14,400 | 15,300 | 16,500 | 22,500 | 30,800 | 39,000 |
| 1,500 | 11,800 | 12,400 | 13,200 | 14,200 | 17,800 | 21,700 | 26,300 |
| 1,600 | 10,600 | 11,200 | 11,700 | 12,420 | 14,600 | 18,000 | 20,100 |
| 1,700 | 9,700 | 10,200 | 10,600 | 11,220 | 12,800 | 15,000 | 18,600 |
| 1,800 | 9,000 | 8,900 | 9,900 | 10,200 | 11,500 | 13,100 | 14,200 |
| 1,900 | 8,400 | 8,350 | 9,200 | 9,600 | 10,500 | 11,400 | 12,400 |
| 2,000 | 7,920 | 8,100 | 8,600 | 8,860 | 9,850 | 10,400 | 11,400 |
| 2,200 | 6,950 | 7,340 | 7,560 | 7,850 | 8,400 | 9,000 | 9,420 |
| 2,400 | 6,450 | 6,600 | 6,890 | 7,100 | 7,400 | 7,850 | 8,700 |
| 2,600 | 5,960 | 6,110 | 6,350 | 6,480 | 6,700 | 7,000 | 7,160 |

The above calculations are sufficient to illustrate the inter-relationship of the several factors involved in the process described here. In Table 4, for "high" hearth pressures, 5, 8 and 10 lbs./sq. in., and at "low" blast temperature, 1000, 1100 and 1200° F., the blank spaces (in the coke consumption column) indicate that 50% ferrosilicon cannot be produced at all, i. e., an infinite coke consumption is inadequate. The hearth pressures "usual" in American blast furnace practice, i. e., 12 to 16 lbs./sq. in., are omitted from the table since the excessively high coke consumptions make such operations lack practical interest, except with high blast temperatures.

It is well to point out that the two important factors which effect the fuel economy of the process, viz., (1) hearth pressure and (2) blast temperature, are not independent of each other. At low blast temperatures, e. g., 1300° F., the coke consumption is increased five fold from 15,000 lbs./ton to 75,000 lbs./ton by raising hearth pressure from 5 lbs./sq. in. below barometric (vacuum operation) to 10 lbs./sq. in. above barometric, i. e., more than $100 per ton of alloy change in fuel cost. At high blast temperature, however, say 2600° F., the same change in hearth pressure increases the coke consumption by only 20% from 5960 lbs./ton to 7160 lbs./ton, a change in fuel cost of about $3 per ton of alloy. The figures given in Table 4 are sufficient to guide the operator in carrying out my invention for the case of 50% ferrosilicon and for the molar concentration shown in Illustration 1. These figures will not apply for values of (Si) and (SiO₂) in Equation 2 different from the 0.836 and 0.563, respectively. The permutations and combinations of coke consumption, blast temperature, hearth pressure, slag composition and metal composition which may be encountered in practice make it impossible to tabulate them all in detail. The operator will need to carry out the above calculations as the furnace operation proceeds, and he may have to repeat these calculations frequently. As an example, if a furnace making 50% alloy has been charged with a ratio of coke to burden to operate with with 9600 lbs. coke per ton of alloy, while the furnace exhibits a hearth pressure of 2 lbs. per sq. in. gauge, the blast temperature required (Table 4) is 1900° F. Should the charge column "tighten up" and the hearth pressure increase to 5 lbs./sq. in., the blast temperature must be increased to 2090° F. in order to maintain the grade of alloy. This rise in blast temperature may cause a further increase in the hearth pressure, e. g., to 10 lbs./sq. in., which will necessitate a further increase in blast temperature to 2180° F. Since such a rise in hearth pressure may occur within an hour's time, it is not possible suddenly to alter the amount of coke in the furnace charge, since the time of passage of a charge through the furnace will be several hours. It is not even possible to ascertain that the silicon content of the alloy has decreased since the pressure rise may occur before metal can be tapped from the furnace, and before a chemical analysis for silicon can be reported from the laboratory. For technical success, control of the furnace must be attained by adjustment of the availability of the thermal input to correspond to changes in the value of $T_c$ occurring during the operation.

Fortunately, there is but a slight change in $T_c$ caused by changes in the grade of the alloy, for high silicon contents. The following table will illustrate this fact.

*Table 5.—Molar concentration of silicon in ferrosilicon of varying silicon content*

| Weight percentage of silicon in the alloy | 50 | 80 | 90 | 100 |
|---|---|---|---|---|
| Molar percentage of silicon (Si) in the alloy | 83.30 | 95.84 | 98.09 | 100.00 |
| Molar percentage of iron silicide (Fe$_3$Si) in the alloy | 16.70 | 4.16 | 1.91 | 00.00 |
| Log$_{10}$ (Si) | −0.080 | −0.018 | −0.007 | 0.000 |
| Temperature of silicon reduction ($T_c$) ° F | 2,858 | 2,868.7 | 2,870.7 | 2,871.9 |

The increase in $T_c$ in raising the grade of alloy from 50 to 100% is only 13.9° F., (7.7° C.), a temperature change much too small to be ascertained in practice. The change in the available heat (in Tables 1 and 2) due to such a 14° F. change in $T_c$ is less than 0.8%, a quantity smaller than the error in determining the thermal quantities involved in the heat balance. In attempting to produce "pure" silicon (100% ferrosilicon) no difficulty is encountered due to any inability of the furnace to reduce silicon. The practical difficulty arises in attempting to find charge materials low enough in iron content. The following will illustrate the problem of increasing the grade of the alloy.

ILLUSTRATION 2

The operation described in Illustration 1 is continued, unchanged in every respect except that the cast iron scrap and the steel scrap are omitted from the charge. The tonnage of alloy produced is thereupon reduced from 100 gross tons/day to 78.20 tons/day and the coke consumption per ton of alloy is increased from 6290 lbs./ton to 8000 lbs./ton. The analysis of the alloy produced is increased in grade from 50.37% silicon to 64.20% silicon. The metal composition is as follows:

| Ferrosilicon Composition By weight | | Molecular Composition | |
|---|---|---|---|
| | Per cent | | |
| Si | 64.20 | Si | 90.53 |
| Fe | 35.38 | Fe$_3$Si | 9.02 |
| Mn | 0.21 | FeP | 0.28 |
| P | 0.20 | Mn | 0.16 |
| S | 0.01 | FeS | 0.014 |
| C | 0.00 | | 100.00 |
| | 100.00 | | |

With the same hearth pressure and slag analysis, (SiO$_2$) and (CO) are unchanged and the equilibrium constant is increased from 1.88, in Illustration 1, to 2.04, increasing log$_{10}k$ by 0.035 and increasing the reduction temperature $T_c$ from 2858° F. to 2864° F., a 6° rise, which is completely negligible.

ILLUSTRATION 3

Because of the high iron content of the coke, sandstone, and limestone, the maximum grade of alloy can be produced by using an ash-free petroleum coke for fuel, a high grade sandstone (e. g., a "firestone" from northern Ohio) as a source of silica and marble chips for flux with materials of the following analysis:

| | Sandstone | Marble Chips |
|---|---|---|
| SiO$_2$ | 98.58 | 0.35 |
| Al$_2$O$_3$ | 1.21 | 0.13 |
| CaO | 0.03 | 55.00 |
| MgO | 0.02 | 0.56 |
| Fe$_2$O$_3$ | 0.11 | 0.09 |
| SO$_3$ | 0.01 | 0.03 |
| P$_2$O$_5$ | 0.007 | 0.013 |
| CO$_2$ | 0.03 | 43.86 |

The furnace is charged with:

| | Lbs./day |
|---|---|
| Petroleum coke (98.53° F. C.) | 552,000 |
| Sandstone | 328,000 |
| Marble chips | 36,000 |

The same furnace and the same operating conditions are used as in Illustration 1. The furnace produces 51.5 gross tons/day of "alloy" and 45.5 gross tons/day of slag. The analysis of the slag is:

| By Weight | | Molecular Composition | |
|---|---|---|---|
| | | | Molar per cent |
| SiO$_2$ | 76.30 | Silica | 71.36 |
| Al$_2$O$_3$ | 3.96 | Wollastonite | 25.10 |
| CaO | 19.54 | Anorthite | 3.14 |
| MgO | 0.20 | Enstatite | 0.40 | and the alloy analysis is:

| | |
|---|---|
| Si | 99.744 |
| Fe | 0.237 |
| P | 0.017 |
| S | 0.002 |

The coke consumption for this exceedingly "pure" silicon is 10,700 lbs./ton, which may seem to be an increase over the coke consumption of 6290 lbs./ton in Illustration 1 and 8000 lbs. in Illustration 2. When coke consumption is reported in terms of "per tons of silicon produced," instead of "per ton of alloy," the coke consumptions are: Illustration 1, 6290 lbs. coke for 50.37% alloy or 12,420 lbs. coke per ton of silicon reduced; Illustration 2, 8000 lbs. coke/ton for 64.20% alloy or 12,400 lbs. per ton of silicon; and Illustration 3, 10,700 lbs./ton of petroleum coke (fixed carbon 98.53), equivalent to 12,200 lbs. of coke at 86.22% fixed carbon. There is a slightly lower coke consumption when using ashless fuel, since no reduction of coke ash silica occurs, with a corresponding saving both in carbon and in available heat. Because of the absence of silicon fume from the coke ash, sticking up of the charge column does not take place, hanging does not occur, and the hearth pressure can be maintained at an average of 0.54 lb./sq. in gauge. The equilibrium constant $k$ for Illustration 3 is 1.51 which is lower than the 1.88 value in Illustration 1. In this particular case, substantially 100% silicon metal is produced with a lower reduction temperature, and with lower coke consumption, than the 50% ferrosilicon required. The gas is cleaner, there is less silica fume present, the furnace pressures are lower, and the movement of the charge column is improved. The major difficulty encountered in producing such pure silicon is caused by the low density of the metal. Silicon is almost as light as the slag and the separation of slag from metal both in the hearth and after tapping from the furnace is quite difficult.

Success in the blast furnace smelting of ferrosilicon can be attained by supplying the smelting zone wtih sufficient heat "available for silicon reduction" to carry out the heat-absorbing hearth reactions. In the electric furnace all of the heat derived from electric energy is "available" for all and any purpose. By comparison, the 30% "availability" of the thermal input in Illustration 1 appears discouragingly low. And this is particularly true when it is remembered that the astoundingly high blast temperature of 2750° F. is required to realize an availability of this low figure. With the low blast temperatures used in present-day furnace practice, the fraction of the total thermal input which is available for hearth reactions is almost ridiculously low, and it must be emphasized that the 30% availability in Illustration 1 is attained only by altering the furnace dimensions and the blowing procedure in order to operate with the low hearth pressure shown there, less than one-fifth of the gauge pressure which is customary in the typical blast furnace. With usual low blast temperatures and high hearth pressure, it is easy to understand why previous efforts to produce high analysis alloy have failed.

It is to be observed that in carrying out my invention it is necessary to abandon many of the basic principles which years of blast furnace experience have taught the furnace operator. My invention requires raising the blast temperature to such a high value that the furnace is caused to hang. My process makes an exaggerated irregularity in blowing rate desirable, and causes a maximum irregularity in descent of the charge column. This method of furnace operation violates the operator's most respected tenet, that a "smooth working" furnace is essential to good practice. My invention teaches that a great improvement in economy is attained by operating with a "short" furnace, e. g., 25, 30 or 40 feet high; also, that the hearth pressure should be maintained at a low value. These facts help to explain why an obvious extension of currently recognized blast furnace methods has not been successful in increasing silicon contents into the ferrosilicon range, whether the desired silicon was 25, 65 or 95%.

Attempts have been made to duplicate the electric furnace technic, by charging a blast furnace with coke, scrap and substantially just enough silica to produce the silicon in the alloy, so as to produce no greater slag volume than is formed by the minor impurities, $Al_2O_3$, CaO, MgO, etc., inevitably present in the charge materials. Such attempts were unsuccessful. Since no explicit statement of the function of the slag in the blast furnace production of ferrosilicon appears in technical literature, it is important to explain here the principles involved, since operating difficulties will be encountered in carrying out my invention whenever the slag volume is insufficient or absent. In controlling the composition and amount of slag in my process, the following principles obtain:

I. The slag should be as silicious as possible (i. e., exhibit a maximum molar concentration of "free" silica). Two factors limit this maximum: (a) the slag viscosity must not be so high (the viscosity depending on the slag temperature, cf. Feild and Royster, loc. cit. supra) that its free-flowing properties are impaired; (b) it must contain sufficient lime to combine with the sulphur in the coke, to produce CaS, which must be kept diluted to a sufficiently low molar concentration to maintain a satisfactorily low sulphur content in the metal.

It is true that at the high hearth temperatures prevailing in a ferrosilicon furnace the desulphurization reaction proceeds almost to completion, and that this is also favored by low hearth pressure, but there is, in every case, a maximum concentration of calcium sulphide in the slag beyond which high sulphur metal will result. With 1600° F. hot blast, 8 lbs. hearth pressure, making 50% alloy (Table 4, Illustration 1) the coke consumption is 18,000 lbs./ton of alloy. With coke containing 1.5% sulphur, the charge contains 270 lbs. sulphur/ton alloy. If this sulphur were not absorbed in the slag, the sulphur content of the metal would be 12%. If a slag volume of 1000 lbs./slag/ton metal (a typical slag volume in standard American blast furnace practice, cf. Royster and Joseph loc. cit. supra) were maintained, the sulphur content of the slag would be 27%, or 47.5% (by weight) calcium sulphide, a prohibitively high figure. It is seen that the amount of slag customary in blast furnace practice is wholly insufficient in ferrosilicon practice, a fact which has been responsible for some of the previous failures. It is not safe to assume (without the present statement) that the operator "would naturally increase slag volume" in attempting to produce ferrosilicon, since the precepts of electric furnace practice, with no slag volume at all, might induce him to do exactly the opposite.

II. As shown by Equation 4, the reduction of silicon takes place at all temperatures above $T_c$ (in Illustration 1, 2858° F.). Whenever the temperature is below $T_c$ this reaction is reversed, i. e., Si is oxidized by CO. If the metal bath in the furnace hearth is not covered with a protective layer of slag but is left exposed to CO, it cools below $T_c$ and its surface becomes covered with unfused $SiO_2$ produced according to the equation:

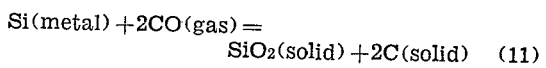

$$Si(metal) + 2CO(gas) = SiO_2(solid) + 2C(solid) \quad (11)$$

The first ferrosilicon flowing down on the hearth bottom after each cast spreads out into a thin liquid layer. If exposed to furnace gases, its surface becomes coated with a thin layer of unfused silica (melting point of $SiO_2$ 3092° F.). The successive additions of ferrosilicon trickling into the hearth spread out on top of the solid films of $SiO_2$ and the lower part of the hearth builds up with these lamellar layers of silicon and silica. When the furnace is "tapped" nothing flows out and the hearth is said to "freeze up" although its temperature is well above the melting point of silicon (2600° F.). A bath of molten silicon can be maintained liquid, without a protective layer of slag interposed between its surface and the furnace gases when this "freezing up" of the hearth bottom has lifted the surface of the metal bath up close enough to the combustion zone to keep its temperature above $T_c$.

III. When the difficulty from reoxidation disappears, a new difficulty is encountered due to vaporization of silicon from the surface of the metal. When the metal temperature is below $T_c$ (and reoxidation occurs), the vapor pressure of silicon is low—0.069 mm. Hg vapor pressure at $T_c = 2853°$ F. (in Illustration 1). If the total volume of furnace gases were saturated with silicon vapor at this partial pressure, the loss of silicon from the alloy would be less than 0.25%. Superheating the surface of the metal bath by exposure to gas from the combustion zone with its temperature at 3500° F. to 4500° F. (depending upon the blast temperature), loss of silicon by vaporization may amount to 20 to 40% of the silicon reduced. The resultant loss of available heat is not as serious as the clogging of the gas channels in the charge column, when the silicon vapor is reoxidized by carbon monoxide. The silica fume is added to the fume from the coke ash silica, and intensifies the choking of the charge column.

These two difficulties, due either to distillation of silicon from the bath (III) or to the formation of a silica crust on the surface of the metal bath (II), are both avoided by providing a sufficient volume of slag to keep the metal covered at all times with a protective bath of slag which prevents contact with CO (causing oxidation) or superheating (causing vaporization).

It has seemed necessary to point out that the present invention provides for the production both of metal and of slag (differing thus from present ferrosilicon practice which does not produce slag) but that this provision cannot be complied with in any simple manner by charging the furnace with the "right amount" of materials to produce some selected slag volume of some selected composition. The amount of slag produced and its composition are controlled not so much by the relative amounts of the several materials charged as by the amount of silicon reduced, and this latter quantity depends primarily upon available hearth heat. The customary instruction to adjust the relative amounts of coke, iron, silica and flux, to produce an "acid" slag of a specified slag volume, is completely without meaning in the production of ferrosilicon. The slag produced may be "acid," "basic" or "neutral" with a fixed charge depending upon how much of the $SiO_2$ in the charge enters the metal as silicon or remains unreduced in the slag. If all the $SiO_2$ is reduced the slag will consist only of the CaO, MgO and $Al_2O_3$ in the charge and will not only not be "silicious" but will not even contain any silica at all. If none of the $SiO_2$ is reduced, the slag will be so high in silica that its excessive viscosity will seriously interfere with furnace performance. The operator must know, before selecting materials for the furnace charge, approximately how much $SiO_2$ is going to be converted to silicon and how much is going to stay in the slag. He can know this only if he knows what the available hearth heat will be. The available hearth heat depends upon $T_c$, which depends upon ($SiO_2$), which depends upon silicon reduction, which depends upon the available hearth heat. Since the available heat can be found by the method illustrated in Tables 1 and 2, the proper amount of each charge constituent (coke, silica, flux, ore scrap, etc.) can be determined without difficulty. When the value of the available heat has not been so determined, successful operation of the process is difficult to attain.

The hearth heat balance (Tables 1 and 2) suggests that some advantage might be had, particularly at lower blast temperatures (including cold blast), from enriching the blast with oxygen. The use of oxygen enrichment is disclaimed as lying outside the scope of my invention, since known methods of producing an oxygen enriched blast are too expensive for operation with oxygen enriched blast to be economical. The oxygen costs more than the fuel saving is worth. From Tables 1 and 2 it is also obvious that ridding the blast of its natural moisture is functionally equivalent to increasing the blast temperature. To the extent that moisture present in atmospheric air can be removed at low expense, increasing the available heat in this way is economical, and the saving of coke may or may not pay for the cost of drying the blast. This depends on the method used for removing blast moisture. Within the meaning of this explanation, the term "blast of air" as used herein is sufficiently clear.

The term "availability" of heat for carrying out smelting zone reactions is defined as the fraction:

$$\text{Availability} = \frac{\text{item (11) minus item (10)}}{\text{item (11)}} \text{ in Table 2}$$

The "available heat" (in B. t. u.) per lb. of carbon is the sum of items 1 to 9 in Table 2.

When the term "carbonaceous fuel" or "carbon," or "solid fuel" is used herein, reference is made specifically to metallurgical coke, anthracite, bituminous coal (coking and non-coking), lignite, peat (natural, dried, or carbonized), gashouse coke, petroleum coke, oil still residue, briquettes of coal, coke or sawdust, wood, charcoal, etc., i. e., any form of carbon a substantial part of which is non-volatile at high temperature.

When the term "iron" is used as applied to a constituent of the furnace charge, reference is to any material containing iron, either as ore, or metallic scrap. Ore may be hematite, magnitite, mill scale, iron carbonate, iron silicate, roasted pyrites, etc. The sulphur content of the iron component of the charge may be higher than in normal pig-iron practice.

Where "silica" is designated as a charge component, it includes not only quartz, quartzite, sandstone, shale and sand, but also silicates and alumino-silicates, hydrated or anhydrous, or any material containing silica.

I claim:

1. Process of producing an iron-silicon alloy of more than 20% silicon in a shaft furnace blown with preheated atmospheric air, which comprises feeding the furnace with solid carbonaceous fuel, silica, iron, alumina and a basic flux, blowing the charge with atmospheric air preheated to a temperature substantially in excess of 1500° F., adjusting and maintaining the amount of silica in the charge to provide a concentration of silica in the resulting slag in substantial excess of that required to combine with its basic constituents, and adjusting and maintaining the amount of solid carbonaceous fuel in the charge to provide sufficient heat to maintain the reduction reactions taking place in the furnace hearth.

2. In the process of producing an iron-silicon alloy of more than 20% silicon content in a shaft furnace blown with preheated atmospheric air, involving the steps of feeding the furnace with solid carbonaceous fuel, silica, iron, alumina and a basic flux, blowing the charge with atmospheric air preheated to a temperature substantially in excess of 1500° F., adjusting and maintaining the amount of silica in the charge to provide a concentration of silica in the resulting slag in substantial excess of that required to combine with its basic constituents, and adjusting and maintaining the amount of solid carbonaceous fuel in the charge to produce sufficient heat to maintain the reduction reactions taking place in the furnace hearth, the improvement which comprises blasting the said furnace with preheated air at a temperature sufficiently high to cause pronounced and persistent interruption in descent of the charge in the furnace, and thereafter maintaining the blast at the said temperature and causing discontinuous descent of the charge by repeated interruptions in the flow of blast air into the furnace.

3. In the process of producing an iron-silicon alloy of more than 20% silicon content in a shaft furnace blown with preheated atmospheric air, involving the steps of feeding the furnace with solid carbonaceous fuel, silica, iron, alumina and a basic flux, blowing the charge with atmospheric air preheated to a temperature substantially in excess of 1500° F., adjusting and maintaining the amount of silica in the charge to provide a concentration of silica in the resulting slag in substantial excess of that required to combine with its basic constituents, and adjusting and maintaining the amount of solid carbonaceous fuel in the charge to produce sufficient heat to maintain the reduction reactions taking place in the furnace hearth, the improvement which comprises controlling the rate of blast flow with reference to the furnace dimension whereby the normal blast pressure is not more than 9 pounds per square inch gauge, and maintaining downward movement of stock in the furnace by altering the rate of blast flow discontinuously without decrease in blast temperature.

4. In the process defined in claim 1 the improvement which comprises controlling the available hearth heat whereby the ratio of silicon produced to the silicon not reduced causes the production of a metal and a silicious slag with the ratio of slag weight to metal weight not less than unity and whereby the ratio of fuel carbon to silicon is not greater than 25 to 1, maintaining the temperature of the preheated air blast at not less than 1600° F., and so controlling the rate of air flow into the furnace that the pressure of the gases in the furnace hearth does not exceed 10 pounds per square inch gauge.

5. The process of producing an iron-silicon alloy of more than 20% silicon content in a shaft furnace blown with preheated atmospheric air, involving the steps of feeding the furnace with solid carbonaceous fuel, silica, iron, alumina and a basic flux, blowing the charge with atmospheric air preheated to a temperature substantialy in excess of 1500° F., adjusting and maintaining the amount of silica in the charge to provide a concentration of silica in the resulting slag in substantial excess of that required to combine with its basic constituents, and adjusting and maintaining the amount of solid carbonaceous fuel in the charge to produce sufficient heat to maintain the reduction reactions taking place in the furnace hearth, wherein the blast is heated to a temperature sufficiently high to impede the uniform settling of the charge through the furnace shaft and to cause a progressive increase in hearth pressure, and wherein at appropriate intervals the flow of air into the furnace is interrupted before the hearth pressure has increased sufficiently to halt the descent of the charge, whereby the time average of the hearth pressure is less than would obtain by permitting the pressure to halt the said descent.

6. The process of producing in a blast furnace an iron-silicon alloy containing not less than 20% silicon by weight, which comprises charging carbon in the form of solid fuel, with an iron-bearing constituent, a silicious charge component, and a basic flux, blasting the furnace with air preheated to at least 1600° F., maintaining the level of the charge in the furnace at a height not in excess of 40 feet above the blast entrance, restricting the rate of blowing to a value sufficiently below a flow rate of 150 cubic feet per minute of blast, measured under atmospheric conditions, per square foot of furnace cross-section at its maximum diameter to maintain a pressure in the furnace hearth of less than 7 pounds per square inch gauge pressure, so controlling the relation of $SiO_2$, $Al_2O_3$, CaO, MgO and S in the slag that the composition of the slag as removed from the furnace, when computed on a molar basis, as $CaSiO_3$, $MgS_2O_3$, CaS, $CaAl_2Si_2O_8$ shall exhibit a content of $SiO_2$ in excess of the silica in the said silicate not less than 15 molar percent, while controlling the amount of carbon charged to an amount not in excess of twenty pounds per pound of silicon reduced and removed in the ferrosilicon produced.

7. The process of producing ferrosilicon, which comprises feeding into a blast furnace solid carbonaceous fuel together with a burden consisting mainly of iron, silica, and a basic flux the ratio of iron to silica in said burden being not greater than 11 to 30, heating the air blast to an entrant temperature in excess of 2000° F., and so controlling the ratio of fuel carbon charged to ferrosilicon produced that the hearth is maintained at a temperature adapted to the production of ferrosilicon containing not less than 50% silicon by weight.

PERCY H. ROYSTER.

REFERENCES CITED

The following references are of record in the file of this patent:

UNITED STATES PATENTS

| Number | Name | Date |
| --- | --- | --- |
| Re. 14,547 | Johnson | Nov. 12, 1918 |
| 2,238,078 | Royster | Apr. 15, 1941 |
| 2,280,452 | Royster | Apr. 21, 1942 |

OTHER REFERENCES

Blast Furnace and Steel Plant, vol. 19, Jan.–June 1931, pp. 399–401; Government Printing Office. (On file in Scientific Library, U. S. Patent Office.)

Clements Blast Furnace Practice, vol. III, p. 359; Clements; Ernest Benn, Ltd., London 1929. (On file in Div. 3, of the U. S. Patent Office.)

Blast Furnace Practice, vol. III, p. 81, Clements; 1929, Ernest Benn Ltd., London. (On file in Div. 3 of the Patent Office.)